(12) United States Patent
Rajagopal et al.

(10) Patent No.: US 12,461,729 B2
(45) Date of Patent: Nov. 4, 2025

(54) CLOUD AUTOMATION SITE DESIGN AND METHOD

(71) Applicant: RELIANCE JIO INFOCOMM USA, INC., Frisco, TX (US)

(72) Inventors: Arun Rajagopal, Frisco, TX (US); Abhijeet Singh, Seattle, WA (US); Venugopal Kanumalla, Frisco, TX (US)

(73) Assignee: RELIANCE JIO INFOCOMM USA, INC., Frisco, TX (US)

( * ) Notice: Subject to any disclaimer, the term of this patent is extended or adjusted under 35 U.S.C. 154(b) by 641 days.

(21) Appl. No.: 17/689,430

(22) Filed: Mar. 8, 2022

(65) Prior Publication Data

US 2023/0289159 A1   Sep. 14, 2023

(51) Int. Cl.
*G06F 8/61* (2018.01)
*G06F 8/71* (2018.01)
*H04L 67/00* (2022.01)

(52) U.S. Cl.
CPC .................. *G06F 8/61* (2013.01); *G06F 8/71* (2013.01); *H04L 67/34* (2013.01)

(58) Field of Classification Search
CPC ............... G06F 8/61; G06F 8/71; H04L 67/34
See application file for complete search history.

(56) References Cited

U.S. PATENT DOCUMENTS

| | | | |
|---|---|---|---|
| 7,523,892 B2 | 4/2009 | Cook | |
| 7,685,083 B2 | 3/2010 | Fairweather | |
| 7,689,510 B2 | 3/2010 | Lamkin et al. | |
| 8,112,176 B2 | 2/2012 | Solomon | |
| 8,566,115 B2 | 10/2013 | Moore | |
| 8,958,662 B1 | 2/2015 | Grosz et al. | |
| 9,367,362 B2 | 6/2016 | Kern | |
| 9,692,707 B2 | 6/2017 | Tang et al. | |
| 9,740,757 B1 | 8/2017 | Gilder et al. | |
| 9,794,370 B2 | 10/2017 | Abbasi et al. | |
| 9,911,290 B1 | 3/2018 | Zalewski et al. | |
| 9,960,637 B2 | 5/2018 | Sanders et al. | |
| 10,221,013 B2 | 3/2019 | Buzan et al. | |
| 10,346,621 B2 | 7/2019 | Athuluru TIrumala et al. | |
| 10,503,493 B2 * | 12/2019 | Narayanan | G06F 8/61 |
| 10,740,293 B2 | 8/2020 | Maturana et al. | |
| 10,746,428 B2 | 8/2020 | Przybylski et al. | |

(Continued)

OTHER PUBLICATIONS

International Search Report and Written Opinion of the International Search Authority—The European Patent Office—mailed May 9, 2023 for International Application No. PCT/US23/14672, 12 pages.

*Primary Examiner* — Marina Lee
(74) *Attorney, Agent, or Firm* — Jackson Walker LLP; Christopher J. Rourk

(57) ABSTRACT

A system for configuring a network, comprising a network software repository operating on a first processor and configured to store one or more algorithms for each of a plurality of hardware items and to implement version control for each of the one or more algorithms. A network software installation system operating on a second processor is configured to install a current version of one or more algorithms on each of a plurality of site-specific hardware items and to configure each of the plurality of site-specific hardware items to interoperate with each other.

20 Claims, 3 Drawing Sheets

(56) References Cited

U.S. PATENT DOCUMENTS

| | | |
|---|---|---|
| 10,769,231 B2 | 9/2020 | Kol et al. |
| 10,778,534 B2 | 9/2020 | Chitalia et al. |
| 10,834,562 B1 | 11/2020 | Zalewski et al. |
| 10,867,282 B2 | 12/2020 | Glunz |
| 10,999,163 B2 | 5/2021 | Abraham |
| 10,999,251 B2 | 5/2021 | Miriyala et al. |
| 11,124,361 B2 | 9/2021 | Lert et al. |
| 11,138,539 B2 | 10/2021 | Sethi et al. |
| 11,189,368 B2 | 11/2021 | Heath |
| 11,947,933 B2 * | 4/2024 | Todirel ............... G06F 11/1471 |
| 2007/0093970 A1 | 4/2007 | Padmanabhan et al. |
| 2011/0246627 A1 | 10/2011 | Kern |
| 2016/0189174 A1 | 6/2016 | Heath |
| 2017/0041189 A1 | 2/2017 | Aswathanarayana et al. |
| 2017/0177324 A1 * | 6/2017 | Frank .................... G06F 16/958 |
| 2017/0289060 A1 | 10/2017 | Aftab et al. |
| 2018/0052451 A1 | 2/2018 | Billi-Duran et al. |
| 2019/0109810 A1 | 4/2019 | Rapaport et al. |
| 2019/0140580 A1 | 5/2019 | Poivet |
| 2019/0332785 A1 | 10/2019 | Athuluru Tlrumala |
| 2020/0133666 A1 | 4/2020 | Prinsloo et al. |
| 2020/0136930 A1 | 4/2020 | Szulman et al. |
| 2021/0019194 A1 | 1/2021 | Bahl et al. |
| 2021/0168046 A1 * | 6/2021 | Madala .................. H04L 41/20 |
| 2021/0389338 A1 | 12/2021 | Kochar et al. |
| 2022/0236976 A1 * | 7/2022 | Wiegley ................... G06F 8/71 |
| 2023/0379208 A1 * | 11/2023 | Rajagopal ........... H04L 41/0803 |

* cited by examiner

CLOUD AUTOMATION SITE DESIGN AND METHOD

RELATED APPLICATIONS

This non-provisional application is related to U.S. patent application Ser. No. 17/713,490 filed Apr. 5, 2022 entitled "CLOUD AUTOMATION MICROBOTS AND METHOD OF USE" and is related to U.S. patent application Ser. No. 17/750,473 filed May 23, 2022 entitled "CLOUD AUTOMATION AGENTS AND METHOD OF USE", and is related to U.S. patent application Ser. No. 17/734,480 filed May 2, 2022 entitled "AUTOMATED BOT FOR ERROR-FREE RACKING-STACKING", which are hereby incorporated by reference for all purposes, as if presented herein in their entireties.

TECHNICAL FIELD

The present disclosure relates generally to cloud computing, and more specifically to a system and method of cloud automation site design and a method of use.

BACKGROUND OF THE INVENTION

Cloud computing refers to an architecture that allows the specific hardware for an application to be dynamically configured on demand without the need for any specification by the user.

SUMMARY OF THE INVENTION

A system for configuring a network is disclosed that includes a network software repository operating on a first processor that is configured to store one or more algorithms for each of a plurality of hardware items, and to implement version control for each of the one or more algorithms. A network software installation system operating on a second processor is configured to install a current version of one or more algorithms on each of a plurality of site-specific hardware items and to configure each of the plurality of site-specific hardware items to interoperate with each other.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
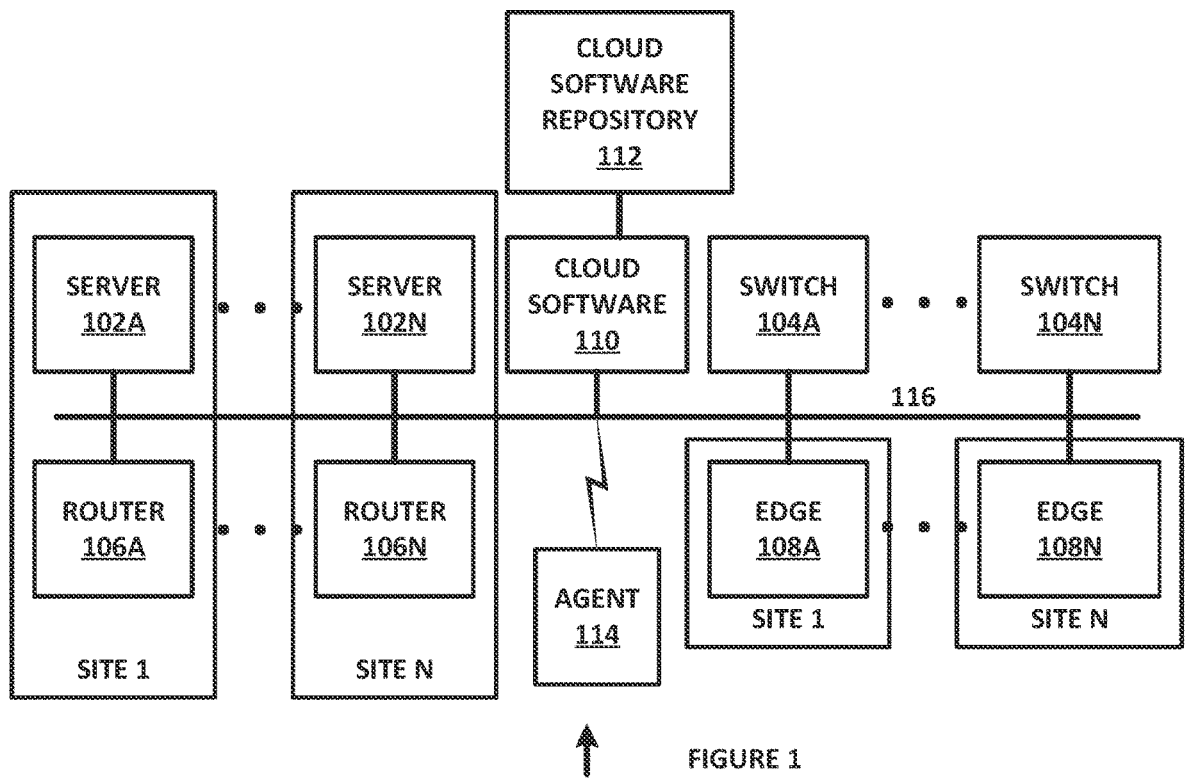
FIG. 1 is a diagram of a system for cloud computing site hardware and automated cloud software installation for an entire cloud computing system, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

The present disclosure is related to systems and algorithmic processes that are typically implemented in software that operates on a processor, to enable telecom operators and other network operators to fully mechanize the process of installing and configuring hardware and associated software for a cloud computing environment or other suitable computing or telecommunications environments, such as servers, switches, routers, edge servers, networking software, server software, patch cabling, radio band units and other hardware and software used for build and operations of distributed telecommunications company cloud and edge infrastructure. The present disclosure provides the technical features of enabling telecom operators and hardware Original Equipment Manufacturer (OEM) partners to provide a consistent and reliable experience to the end consumer of the cloud computing environment by enabling error free deployment of hardware and software elements.

In one example embodiment, the disclosed automation system and algorithmic processes can be used by an OEM vendor to rack, stack and deliver hardware to a customer, to install the hardware without any errors or re-runs, to configure the hardware with associated software, to resolve complex logistics challenges, to configure data centers, mobility locations, remote edge locations or to provide other suitable functions. The present disclosure can be used to provide on-demand infrastructure racking layout, automated workflows and other suitable functions. The present disclosure can include an application that runs on a mobile device or laptop computer, to assist an installer and also to certify the installed system components and to provide sign-off for the work after it has been completed.

The present disclosure can be implemented using components that run centrally and provide a dashboard with target design configurations of hardware to be stacked and a smart application that runs on a mobile device, either connected or in a disconnect mode, as well as other suitable configurations. In one example embodiment, machine learning models can be used to detect physical networking connections such as RJ45 compatible devices, fiber optic media, small form factor pluggable devices, coaxial compatible devices, HDMI devices and so forth, to interpret design information that is obtained from a cloud software repository, to validate a configuration state and to perform other suitable functions, such as to determine whether a device is plugged in to a port or not, if it is in the right port as per the design specification, whether the software applications installed on the device are correct and are configured correctly and other suitable functions. A workflow running on the remote agent can be used to finalize the racking-stacking in a series of steps, such as where a user can generate image or video data that is analyzed to determine whether equipment is in a proper configuration, where machine learning can instruct the user to perform a next action based upon success on current step and in other suitable embodiments.

FIG. 1 is a diagram of a system 100 for cloud computing site hardware and automated cloud software installation for an entire cloud computing system, in accordance with an example embodiment of the present disclosure. System 100 includes servers 102A though 102N, switches 104A through 104N, routers 106A through 106N, edge servers 108A through 108N, cloud software installation and maintenance system 110, cloud software repository 112 and agent 114, which are coupled over network 116, and which can be implemented as a wireline data communications medium, a wireless data communications medium, an optical data communications medium, other suitable data communications media or a suitable combination of data communications media.

Servers 102A though 102N can be implemented as separate hardware enclosures containing individual systems, separate hardware racks containing multiple system elements such as blades or cards, individual system elements such as blades or cards or other suitable systems or devices that are used in a cloud computing environment to provide cloud computing services upon demand. Servers 102A though 102N can be implemented at a single site, or at a plurality of different sites, such as where each server 102A through 102N is at a dedicated site 1 through site N as shown, where groups of servers 102A through 102N are at two or more different sites, where the number of different sites is less than the total number of servers, or in other suitable embodiments. Servers 102A though 102N can include one or more processors, one or more memory devices, input/output devices, network interfaces and other suitable components to allow them to be installed in a cloud computing system and automatically configured by cloud software system 110 or in other suitable manners to provide cloud computing services.

Switches 104A through 104N can be implemented as separate hardware enclosures containing individual systems, separate hardware racks containing multiple system elements such as blades or cards, individual system elements such as blades or cards or other suitable systems or devices that are used in a cloud computing environment to provide network switching services upon demand, including wireless data switching, wireline data switching, fiber optic data switching, a suitable combination of switching functions or other suitable data switching functions. Switches 104A though 104N can be implemented at a single site, or at a plurality of different sites, such as where each switch 104A through 104N is at a dedicated site 1 through site N as shown, where groups of switches 104A through 104N are at two or more different sites, where the number of different sites is less than the total number of servers, or in other suitable embodiments. The sites associated with servers 102A though 102N can be the same as the sites associated with switches 104A through 104N, can be different, or can include a suitable combination of dedicated sites and shared sites. Switches 104A through 104N can include one or more processors, one or more memory devices, input/output devices, network interfaces and other suitable components to allow them to be installed in a cloud computing system and automatically configured by cloud software system 110 or in other suitable manners to provide network switching for a cloud computing environment.

Routers 106A through 106N can be implemented as separate hardware enclosures containing individual systems, separate hardware racks containing multiple system elements such as blades or cards, individual system elements such as blades or cards or other suitable systems or devices that are used in a cloud computing environment to provide network routing services upon demand. Routers 106A though 106N can be implemented at a single site, or at a plurality of different sites, such as where each router 106A through 106N is at a dedicated site 1 through site N as shown, where groups of routers 106A through 106N are at two or more different sites, where the number of different sites is less than the total number of servers, or in other suitable embodiments. The sites associated with servers 102A though 102N and/or switches 104A through 104N can be the same as the sites associated with routers 106A through 106N, can be different, or can include a suitable combination of dedicated sites and shared sites. Routers 106A through 106N can include one or more processors, one or more memory devices, input/output devices, network interfaces and other suitable components to allow them to be installed in a cloud computing system and automatically configured by cloud software system 110 or in other suitable manners to provide network routing for a cloud computing environment.

Edge servers 108A through 108N can be implemented as separate hardware enclosures containing individual systems, separate hardware racks containing multiple system elements such as blades or cards, individual system elements such as blades or cards or other suitable systems or devices that are used in a cloud computing environment to provide edge network services upon demand. Edge servers 108A though 108N can be implemented at a single site, or at a plurality of different sites, such as where each edge server 108A through 108N is at a dedicated site 1 through site N as shown, where groups of edge servers 108A through 108N are at two or more different sites, where the number of different sites is less than the total number of servers, or in other suitable embodiments. The sites associated with servers 102A though 102N and/or switches 104A through 104N and/or routers 106A through 106N can be the same as the sites associated with edge servers 108A through 108N, can be different, or can include a suitable combination of dedicated sites and shared sites. Edge servers 108A through 108N can include one or more processors, one or more memory devices, input/output devices, network interfaces and other suitable components to allow them to be installed in a cloud computing system and automatically configured by cloud software system 110 or in other suitable manners to provide edge network services for a cloud computing environment.

Cloud software installation and maintenance system 110 can be implemented as one or more algorithms operating on a processor that cause the processor to interact with servers 102A though 102N, switches 104A through 104N, routers 106A through 106N, edge servers 108A through 108N and other components, to install algorithms, applications and other instructions, to configure servers 102A though 102N, switches 104A through 104N, routers 106A through 106N, edge servers 108A through 108N and other components with a site data configuration and a site physical configuration, and to perform other suitable functions. In one example embodiment, cloud software installation and maintenance system 110 can be implemented using GITOPS from GIT-LAB, located in San Francisco, CA, or other suitable software installation and maintenance systems. Cloud software installation and maintenance system 110 can install specific algorithms on specific predetermined components, such as to configure and provision specific servers to interoperate with other specific servers, specific switches to interoperate with specific servers, specific routers to interoperate with specific servers and switches, specific edge routers to interoperate with specific servers, routers and switches and so forth, so as to provide a fully-configured and provisioned cloud computing system, data communications network or other suitable systems with minimal operator involvement.

Cloud software repository 112 can be implemented as one or more algorithms operating on a processor that cause the processor to provide operational code for servers 102A though 102N, switches 104A through 104N, routers 106A through 106N, edge servers 108A through 108N and other suitable equipment, to maintain and modify algorithms, applications and other instructions, to provide configuration information for use with servers 102A though 102N, switches 104A through 104N, routers 106A through 106N, edge servers 108A through 108N and other suitable components with a site data configuration and a site physical configuration, and to perform other suitable functions. In one example embodiment, cloud software repository 112 can be implemented using GITHUB from GITLAB, located in San Francisco, CA, or other suitable software development and version control systems.

Agent 114 can be implemented as one or more algorithms operating on a processor that cause the processor to interact with cloud software installation and maintenance system 110 and other components of system 100. In one example embodiment, a user can access each component locally and over network 116 to verify that the component has been properly installed and provisioned, such as by using the algorithmic processes and functionality disclosed here or other suitable functionality.

In operation, system 100 provides predefined tasks, allowable site configurations, allowable network details, allowable hardware details, allowable software details and other suitable data for a cloud network installation or other suitable systems. A network design document can be provided in an easy to read format, such as a markup language like XML, yet another markup language (YAML) or other suitable formats that are easy for a human operator to read, and which can be used to implement the process of cloud computing network deployment. In one example embodiment, the design document can include:

A) GITOPS predefined tasks that are stored in multiple files, such as where the file structure is used to provide a site design, such as a data center, a cloud computing network or other suitable systems. The file structure can include code for each server, each data switch, each data router, each edge server and other suitable components, to provide a code delivery mechanism.

B) Site configuration data—the names of equipment (servers, switches, routers), IP addresses and other suitable site configuration data.

C) Site Physical location data, such as building and room numbers, street addresses and so forth.

D) Data Center identifiers.

E) Domain Name System (DNS) data and other infrastructure details, such as a site type (ex: Green, Orange, Red), a form factor and other suitable data.

F) Network Details (such as a single file, multiple files, a YAML file with no specified start and end syntax or other suitable data structures).

G) IP address pools, spine and leaf configurations, border gateway protocol, routing networking layer.

H) Dynamic host configuration protocol information, Preboot eXecution Environment (PXE) information.

I) Hardware Details (separate or one file)

K) Physical node configuration data, including firmware, BIOS, out of band addresses, rack layouts, server layouts, host profiles, disk partitioning and so forth.

L) Software details (separate or one file—software to run cloud and applications in cloud all software runs in cloud), operating system and Boot Configurations, hypervisors, container runtimes, repositories.

In one example embodiment, system 100 can be used to perform a series of steps for provisioning a site design. In a first step, a design blueprint, templates or other suitable code structures can be created. In the second step, the design blueprint can be translated to site-specific code documents. Cloud parameters such as Internet Protocol addresses, DNS data, network time protocol (NTP) data and so forth can be applied. Information from inventory planning applications can be translated to virtual network functions and applications details, security configurations can be applied from information security frameworks or guidelines, Artificial Intelligence and Machine Learning toolsets can be used to verify and validate inputs and other suitable functions can also or alternatively be performed. A final step can include committing an instance of the site design to a central repository and triggering of blockchain events for next steps.

Each item of hardware can also have an associated site or location, such as Site 1 through Site N for servers 102A through 102N, routers 106A through 106N, edge servers 108A through 108N and so forth. While the example embodiment shown in system 100 includes server 102A, router 106A and edge server 108A at Site 1 and server 102N, router 106N and edge server 108N at Site N, other suitable combinations of sites and equipment can also or alternatively be used. For example, a first site can be used for all servers and a second site can be used for all routers, different sites can have different numbers and combinations of equipment or other suitable configurations can be used.

Figure 2:
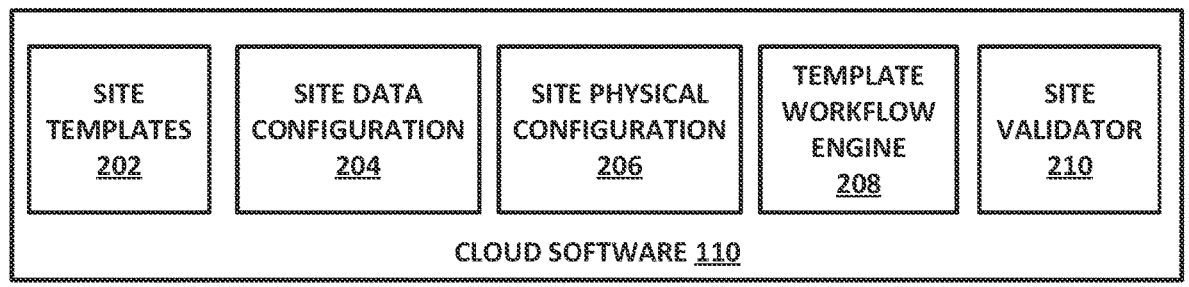
FIG. 2 is a diagram of a cloud software installation and update system, in accordance with an example embodiment of the present disclosure.

FIG. 2 is a diagram 200 of a cloud software installation and update system 110, in accordance with an example embodiment of the present disclosure. Cloud software installation and update system 110 includes site templates system 202, site configuration system 204, site physical configuration system 206, template workflow engine 208 and site validator 210, each of which can be implemented in hardware or a suitable combination of hardware and software.

Site templates system 202 can be implemented as one or more algorithms operating on a processor that cause the processor to select and install one or more code templates on a plurality of devices associated with a cloud computing site or other suitable sites. In one example embodiment, templates can be designed for sites with a predetermined number of components, such as a 10 server cloud, which can include a predetermined number of switches, routers, edge servers and other suitable devices. Site templates system 202 can detect a site configuration from a setting or detected hardware components and can select a suitable template for use with the site, including automated designation of equipment within the site configuration template. Site templates system 202 can also interface with site configuration data system 204, site physical configuration system 206, template workflow engine 208 and site validator 210 to perform automated installation and provisioning of equipment for a cloud computing system or other suitable systems.

Site data configuration system 204 can be implemented as one or more algorithms operating on a processor that cause the processor to configure site equipment with logical device names such as names of servers and routers, with IP addresses and with other suitable site data. In one example embodiment, the site data can be defined in advance for specific site templates, and site data configuration system 204 can be used in conjunction with a local installer to verify that the site data has been properly configured.

Site physical configurations system 206 can be implemented as one or more algorithms operating on a processor that cause the processor to identify physical configurations and locations of servers, routers and so forth. In one example embodiment, a site map or other suitable data can be used to associate specific pieces of equipment with specific floors, rooms, off-site locations and other suitable data.

Template workflow engine 208 can be implemented as one or more algorithms operating on a processor that cause the processor to obtain information from inventory planning software applications and to translate the data to virtual network functions and associated application details, to obtain security configuration data from an information security framework or guidelines, and to perform other suitable functions associated with implementing a template workflow. In one example embodiment, the template workflow engine can install sets of code on equipment in accordance with a predetermined workflow, such as to configure all servers, routers, switches and edge servers first as individual hardware devices, and then to install network software such as virtual network functions and network security, to configure servers associated with a switch or router in parallel and then to interconnect the switches that aggregate traffic from servers directly into a spine or network core, to implement a spine and leaf full-mesh topology, or in other suitable manners.

Site validator 210 can be implemented as one or more algorithms operating on a processor that cause the processor to implement artificial intelligence or machine learning toolsets to verify and validate inputs to hardware components and network systems. In one example embodiment, site validator 210 can use a site blueprint or templates and can verify that the functions associated with the blueprint or templates are configured properly.

Figures 3, 4:
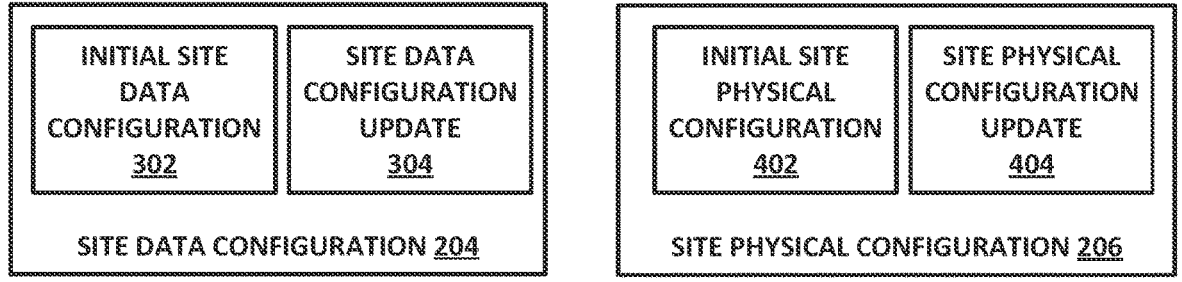
FIG. 3 is a diagram of a site data configuration system, in accordance with an example embodiment of the present disclosure.
FIG. 4 is a diagram of a site physical configuration system, in accordance with an example embodiment of the present disclosure.

FIG. 3 is a diagram 300 of a site data configuration system 204, in accordance with an example embodiment of the present disclosure. Site data configuration system 204 includes initial site data configuration system 302 and site data configuration update system 304, each of which can be implemented in hardware or a suitable combination of hardware and software.

Initial site data configuration system 302 can be implemented as one or more algorithms operating on a processor that cause the processor to generate an initial site data configuration. In one example embodiment, the initial site data configuration can include a file structure, a data structure or other suitable mechanisms for associating site data that is required to configure hardware with specific items of hardware, such as to allow the hardware to be re-configured in the event of the failure of one or more pieces of equipment or for other suitable purposes.

Site data configuration update system 304 can be implemented as one or more algorithms operating on a processor that cause the processor to update a site data configuration to include replacement equipment, new equipment, expanded functions or other suitable site updates. In one example embodiment, the updates can be implemented incrementally, as part of a template that includes multiple items of equipment or in other suitable manners.

FIG. 4 is a diagram 400 of a site physical configuration system 206, in accordance with an example embodiment of the present disclosure. Site physical configuration system 206 includes initial site physical configuration system 402 and site physical configuration update system 404, each of which can be implemented in hardware or a suitable combination of hardware and software.

Initial site physical configuration system 402 can be implemented as one or more algorithms operating on a processor that cause the processor to generate an initial site physical configuration. In one example embodiment, the initial site physical configuration can include equipment identifiers, equipment physical locations or other suitable mechanisms for associating site physical data that is required to identify hardware, such as to allow the hardware to be located in the event of the failure of one or more pieces of equipment or for other suitable purposes.

Site physical configuration update system 404 can be implemented as one or more algorithms operating on a processor that cause the processor to update a site physical configuration to include replacement equipment, new equipment, expanded functions or other suitable site updates. In one example embodiment, the updates can be implemented incrementally, as part of a template that includes multiple items of equipment or in other suitable manners.

Figure 5:
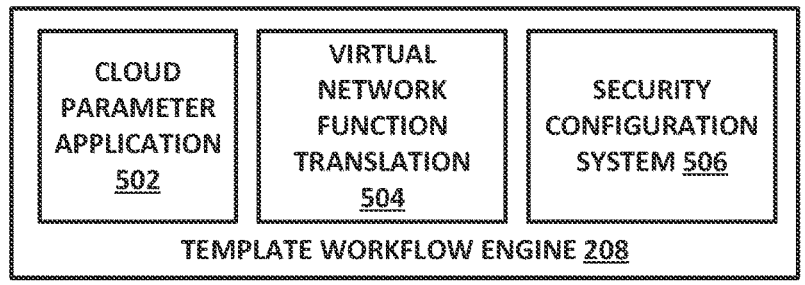
FIG. 5 is a diagram of a template workflow engine, in accordance with an example embodiment of the present disclosure.

FIG. 5 is a diagram 500 of a template workflow engine 208, in accordance with an example embodiment of the present disclosure. Template workflow engine 208 includes cloud parameter application 502, virtual network function translation 504 and security configuration system 506, each of which can be implemented in hardware or a suitable combination of hardware and software.

Cloud parameter application 502 can be implemented as one or more algorithms operating on a processor that cause the processor to generate cloud computing system parameters to configure a plurality of servers, routers, switches, edge servers and other equipment to function as a cloud computing environment. In one example embodiment, cloud parameter application 502 can apply Internet protocol addresses, DNS configuration data, NTP configuration data and other suitable data to a generic design blueprint or template, such as to convert the generic design blueprint or template to a site-specific cloud configuration.

Virtual network function translation 504 can be implemented as one or more algorithms operating on a processor that cause the processor to translate information from inventory planning applications to virtual network functions and associated applications details. In one example embodiment, a virtual network function can include virtualized routers, firewalls, wide area network optimization services, network address translation services or other suitable functions, which can be implemented as virtual machines or in other suitable manners. The virtual network functions can be linked together using service chaining to increase network scalability and agility, reduce power consumption and increase security, as a function of the blueprint for the site. For example, a cloud computing site with 10 servers and associated routers, switches and edge servers can implement a predetermined set of virtual network functions that is different from the virtual network functions for a cloud computing site with 20 or 30 servers.

Security configuration system 506 can be implemented as one or more algorithms operating on a processor that cause the processor to configure the cloud computing network hardware to implement an information security framework. In one example embodiment, the information security framework can implement a National Institute of Standards and Technology (NIST) cybersecurity framework, an ISO-27000 security framework, a cloud security framework or other suitable frameworks that are optimized for the blueprint or template.

Figure 6:
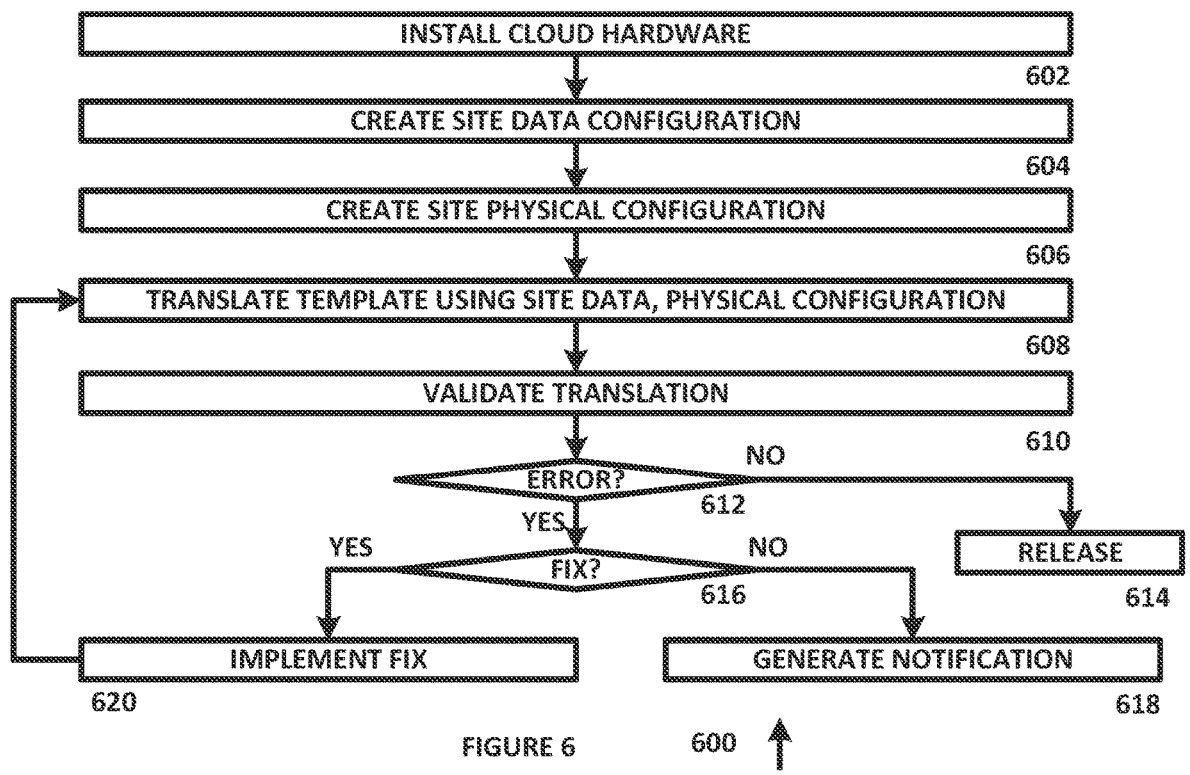
FIG. 6 is a diagram of an algorithm for cloud computing site hardware and automated cloud software installation for an entire cloud computing system, in accordance with an example embodiment of the present disclosure.

FIG. 6 is a diagram of an algorithm 600 for cloud computing site hardware and automated cloud software installation for an entire cloud computing system, in accordance with an example embodiment of the present disclosure. While algorithm 600 is described in regards to cloud computing, it can also or alternatively be used for enterprise networks, telecommunications data processing or other suitable applications. Algorithm 600 can be implemented on one or more processors.

Algorithm 600 begins at 602, where cloud hardware is installed at one or more sites. In one example embodiment, the cloud hardware can be selected based on one of a plurality of design configurations, such as a 10 server configuration, a 20 server configuration and so forth, to support an anticipated demand for services or for other suitable purposes. The algorithm then proceeds to 604.

At 604, site data configuration files are created. In one example embodiment, the site data configuration files can be based on one or more templates, where site-specific data is provided at placeholders in the template, such as using an automated data discovery process, an operator-assisted data discovery process or other suitable processes. The algorithm then proceeds to 606.

At 606, site hardware configuration files are created. In one example embodiment, the site hardware configuration files can be based on one or more templates, where site-specific hardware is provided at placeholders in the template, such as using an automated equipment discovery process, an operator-assisted equipment discovery process or other suitable processes. The algorithm then proceeds to 608.

At 608, one or more templates are translated using site data configuration files and hardware configuration files. In one example embodiment, template translation can include executing one or more processes using the site data configuration files and hardware configuration files to create a site-specific blueprint or other suitable data. The algorithm then proceeds to 610.

At 610, the site is validated. In one example embodiment, validation can be performed by one or more artificial intelligence or machine leaning processes, using operator-assisted processes or in other suitable manners. The algorithm then proceeds to 612.

At 612, it is determined whether errors are present. In one example embodiment, error indications can be generated during the validation process, such as when a design application fails to initiate, when a design routing protocol is not implemented or for other nonconformities. If it is determined that errors are not present, then the algorithm proceeds to 614 where the site is released for operational use, otherwise the algorithm proceeds to 616.

At 616, it is determined whether an automated fix for the error exists, a configuration for operation with a difference exists, or if other suitable solutions are available. If it is determined that a solution is available, then the solution is implemented at 620 and the algorithm returns to 608, otherwise the algorithm proceeds to 618, where an operator notification is generated for manual resolution.

In operation, algorithm 600 provides for cloud computing site hardware and automated cloud software installation for an entire cloud computing system. Although algorithm 600 is shown as a flowchart, a person of skill in the art will recognize that it can also or alternatively be implemented using object-oriented programming, as a state diagram, as a ladder diagram, as a suitable combination of programming paradigms or in other suitable manners.

Figure 7:
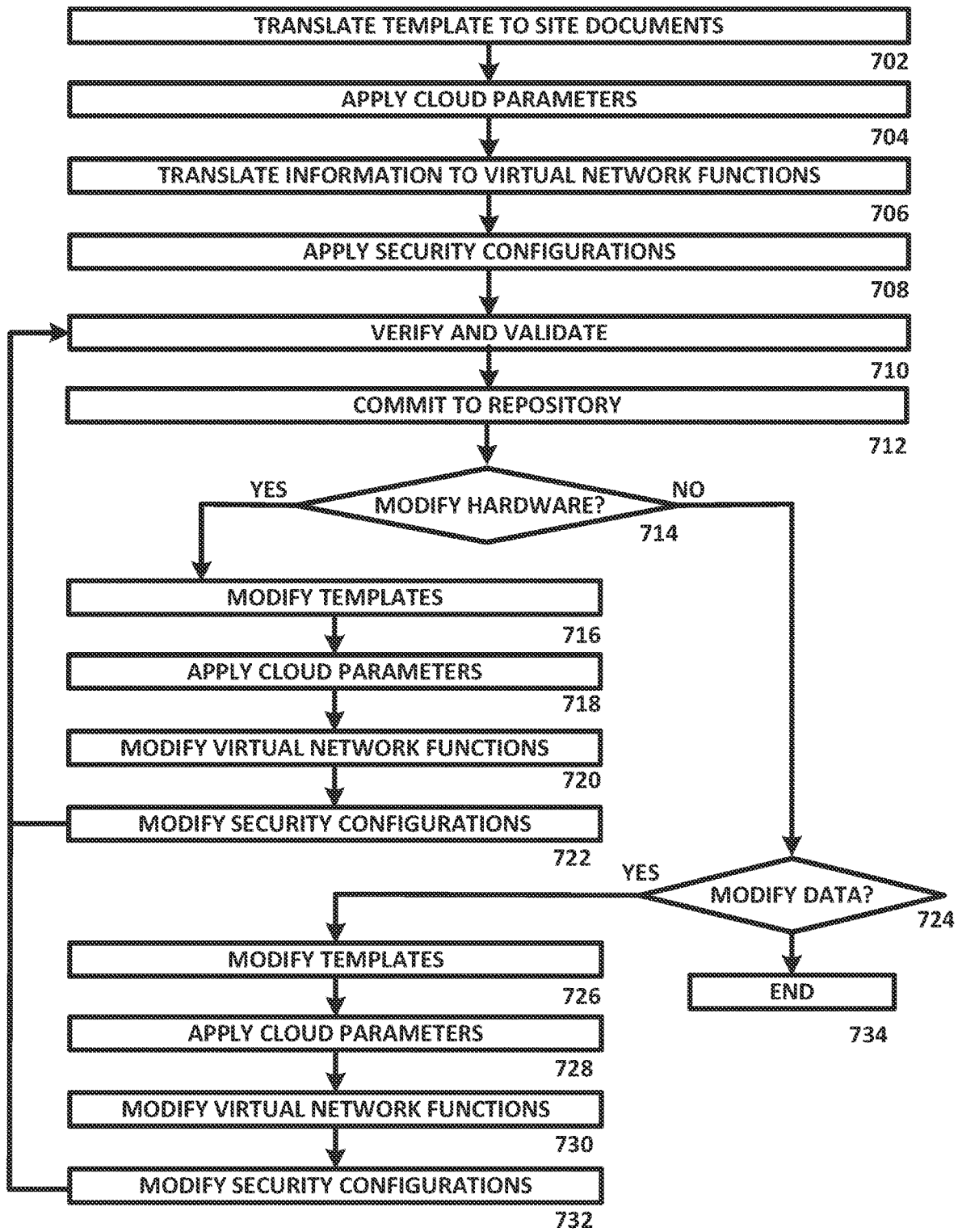
FIG. 7 is a diagram of an algorithm for site design blueprint creation and translation, in accordance with an example embodiment of the present disclosure.

FIG. 7 is a diagram of an algorithm 700 for site design blueprint creation and translation, in accordance with an example embodiment of the present disclosure. Algorithm 700 can be implemented on one or more processors.

Algorithm 700 begins at 702, where a template is translated to one or more site documents. In one example embodiment, template translation can include modification of the template to incorporate site-specific hardware and data configuration files and other suitable data. The algorithm then proceeds to 704.

At 704, cloud parameters or other suitable system parameters are applied to the translated template. In one example embodiment, the cloud parameters can include Internet Protocol data, Domain Name System data, Network Timing Protocol data and other suitable data. The algorithm then proceeds to 706.

At 706, information from inventory planning software applications is translated to virtual network functions. In one example embodiment, the virtual network functions can include virtualized routers, firewalls, wide area network optimization services, network address translation services or other suitable functions, which can be implemented as virtual machines or in other suitable manners. The algorithm then proceeds to 708.

At 708, an information security configuration is applied. In one example embodiment, the information security framework can include a National Institute of Standards and Technology (NIST) cybersecurity framework, an ISO-27000 security framework, a cloud security framework or other suitable frameworks that are optimized for the blueprint or template. The algorithm then proceeds to 710.

At 710, the site design is verified and validated. In one example embodiment, a process like that disclosed in algorithm 600 can be used for site design verification and validation, or other suitable systems or processes can be used, such as those discussed herein. The algorithm then proceeds to 712.

At 712, the site design is committed to a repository. In one example embodiment, a repository can be used to back up the site design data for quick recovery in the event of a catastrophic failure, for subsequent upgrades or for other suitable purposes. The algorithm then proceeds to 714.

At 714, it is determined whether a modification to hardware is being implemented. If a hardware modification is being implemented, the algorithm proceeds to 716, otherwise the algorithm proceeds to 724.

At 716, one or more templates are modified to accommodate the modified hardware. In one example embodiment, the templates can be recreated using the modified hardware, the templates can include hardware-specific files that can be modified or other suitable processes can also or alternatively be used. The algorithm then proceeds to 718.

At 718, cloud parameters are applied to the modified templates. In one example embodiment, the cloud parameters can be recreated using the modified hardware, the cloud parameters can include hardware-specific files that can be modified or other suitable processes can also or alternatively be used. The algorithm then proceeds to 720.

At 720, virtual network functions are modified. In one example embodiment, the virtual network functions can be recreated using the modified hardware, the virtual network functions can include hardware-specific files that can be modified or other suitable processes can also or alternatively be used. The algorithm then proceeds to 722.

At 722, security configurations are modified. In one example embodiment, the security configurations can be recreated using the modified hardware, the security configurations can include hardware-specific files that can be modified or other suitable processes can also or alternatively be used. The algorithm then returns to 710.

If the algorithm proceeds to 724 from 714, it is determined whether configuration data, Internet Protocol data, network security data or other data should be modified. If it is determined that data should be modified, the algorithm proceeds to 726, otherwise ends at 734.

At 726, one or more templates are modified. In one example embodiment, the templates can be recreated using the modified data, the templates can include data-specific files that can be modified or other suitable processes can also or alternatively be used. The algorithm then proceeds to 728.

At 728, the data is applied to cloud parameters. In one example embodiment, the cloud parameters can be recreated using the modified data, the templates can include data-specific files that can be modified or other suitable processes can also or alternatively be used. The algorithm then proceeds to 730.

At 730, virtual network functions are modified using the data. In one example embodiment, the virtual network functions can be recreated using the data, the virtual network functions can include data-specific files that can be modified or other suitable processes can also or alternatively be used. The algorithm then proceeds to 732.

At 732, security configurations are modified using the data. In one example embodiment, the security configurations can be recreated using the modified data, the security configurations can include data-specific files that can be modified or other suitable processes can also or alternatively be used. The algorithm then returns to 710.

In operation, algorithm 700 provides for site design blueprint creation and translation. Although algorithm 700 is shown as a flowchart, a person of skill in the art will recognize that it can also or alternatively be implemented using object-oriented programming, as a state diagram, as a ladder diagram, as a suitable combination of programming paradigms or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for configuring a network, comprising:
    a network software repository operating on a first processor and configured to operate on the first processor under algorithmic control to store one or more algorithms for each of a plurality of hardware items and to implement version control for each of the one or more algorithms;
    a network software installation system operating on a second processor and configured to operate on the second processor under algorithmic control to receive and install the one or more algorithms from the network software repository on each of a plurality of site-specific hardware items using a site design document having each site-specific hardware item associated with one or more of the algorithms for one of the plurality of hardware items, and to configure each of the plurality of site-specific hardware items to interoperate with each other as a function of a physical location of each site-specific hardware item and using one or more cloud computing parameters for the physical location.

2. The system of claim 1 wherein the plurality of site-specific hardware items are configured for cloud computing using an associated Internet protocol address and are located at different physical locations.

3. The system of claim 1 wherein the plurality of site-specific hardware items are configured for an enterprise network and are located at different physical locations of an enterprise and using associated domain name system data for the enterprise.

4. The system of claim 1 wherein the plurality of site-specific hardware items comprise a plurality of servers at two or more different physical locations, a plurality of switches at two or more different physical locations, a plurality of routers at two or more different physical locations and a plurality of edge servers at two or more different physical locations that are each configured to use a common network time protocol.

5. The system of claim 1 wherein the algorithms for one or more of the plurality of hardware items are for one or more of a plurality of servers and are configured for specific ones of the plurality of servers at two or more different physical locations.

6. The system of claim 1 wherein the algorithms for one or more of the plurality of hardware items are for one or more of a plurality of servers and are configured for specific ones of a plurality of switches at two or more different physical locations.

7. The system of claim 1 wherein the algorithms for one or more of the plurality of hardware items are for one or more of a plurality of servers and are configured for specific ones of a plurality of switches at two or more different physical locations and specific ones of a plurality of routers at two or more different physical locations, wherein the switches and the routers are configured for a same location.

8. The system of claim 1 further comprising a site data configuration system operating on the second processor and configured to install specific predetermined site data on each server of a plurality of servers as a function of a physical site location.

9. The system of claim 1 further comprising a site data configuration system operating on the second processor and configured to install specific predetermined site data on each switch of a plurality of switches as a function of a physical site location.

10. The system of claim 1 further comprising a site physical configuration system operating on the second processor and configured to install specific predetermined site physical configuration data on each server of a plurality of servers as a function of a physical site location.

11. A method for configuring a network, comprising:
    storing one or more algorithms for each of plurality of hardware items using a network software repository system operating on a first processor operating under algorithmic control;
    implementing a version control process for each of the one or more algorithms;
    receiving and installing the one or more algorithms from the network software repository on each of a plurality of site-specific hardware items via a site design document having each site-specific hardware item associated with one or more of the algorithms for one of the plurality of hardware items, using a network software installation system operating on a second processor under algorithmic control as a function of a physical site location; and
    configuring each of the plurality of site-specific hardware items to interoperate with each other using the network software installation system as a function of the physical site location and using one or more cloud computing parameters for the physical location.

12. The method of claim 11 wherein the plurality of site-specific hardware items are configured for cloud computing.

13. The method of claim 11 wherein the plurality of site-specific hardware items are configured for an enterprise network.

14. The method of claim 11 wherein the plurality of site-specific hardware items comprise a plurality of servers, a plurality of switches, a plurality of routers and a plurality of edge servers.

15. The method of claim 11 wherein the algorithms for one or more of the plurality of hardware items are for one or more of a plurality of servers and are configured for specific ones of the plurality of servers.

16. The method of claim 11 wherein the algorithms for one or more of the plurality of hardware items are for one or more of a plurality of servers and are configured for specific ones of a plurality of switches.

17. The method of claim 11 wherein the algorithms for one or more of the plurality of hardware items are for one or more of a plurality of servers and are configured for specific ones of a plurality of switches and specific ones of a plurality of routers.

18. The method of claim 11 further comprising configuring a site data configuration system operating on the second processor to install specific predetermined site data on each server of a plurality of servers.

19. The method of claim 11 further comprising configuring a site data configuration system operating on the second processor to install specific predetermined site data on each switch of a plurality of switches.

20. The method of claim 11 further comprising configuring a site physical configuration system operating on the second processor to install specific predetermined site physical configuration data on each server of a plurality of servers.

* * * * *